United States Patent [19]

Fujikawa et al.

[11] Patent Number: 4,647,835

[45] Date of Patent: Mar. 3, 1987

[54] PORTABLE GENERATOR

[75] Inventors: Tetsuzo Fujikawa, Kobe; Yooichi Yamaguchi, Akashi; Yoshiteru Ueda, Kakogawa, all of Japan

[73] Assignee: Kawasaki Jukogyo Kabushiki Kaisha, Kobe, Japan

[21] Appl. No.: 886,953

[22] Filed: Jul. 24, 1986

Related U.S. Application Data

[63] Continuation of Ser. No. 683,412, Dec. 19, 1984, abandoned.

[51] Int. Cl.$^4$ .......................... H02K 5/00; H02K 9/00; H02P 9/04

[52] U.S. Cl. ........................................ 322/1; 290/1 B; 310/58; 310/59

[58] Field of Search ..................... 322/1, 100, DIG. 1; 310/58, 59, 112, 113; 320/62; 290/1 B

[56] References Cited

U.S. PATENT DOCUMENTS

| | | | |
|---|---|---|---|
| 1,987,456 | 1/1935 | Woodard | 310/58 X |
| 2,209,363 | 7/1940 | Sutherland | 290/1 B |
| 3,206,627 | 9/1965 | Marek | 310/59 |
| 4,106,582 | 8/1978 | DeBella | 322/1 X |

FOREIGN PATENT DOCUMENTS

| | | | |
|---|---|---|---|
| 0177569 | 3/1922 | United Kingdom | 290/1 B |

*Primary Examiner*—R. J. Hickey

[57] ABSTRACT

A portable generator in whose casing are housed an engine and a generator directly connected to and driven by the engine. A single cooling fan is provided at the connecting portion of a crankshaft in said engine and a revolving shaft in said generator to produce a unidirectional cooling air flowing from the generator side through the outside and inside of the generator to the engine side, as well as air intake and exit ports are provided in said casing side walls respectively in the vicinity of the side surface opposite to the engine of said generator and opposite to the generator of said engine, thus resulting in a high cooling efficiency of and an enhanced soundproof effect on the engine and generator as well as in a more compact generating system.

2 Claims, 2 Drawing Figures

PORTABLE GENERATOR

This application is a continuation of application Ser. No. 683,412, filed Dec. 19, 1984, now abandoned.

BACKGROUND OF THE INVENTION

This invention relates to a portable generator, in particular to its cooling system, which houses an engine and a generator directly connected to and driven by the engine within a casing.

The prior art for the cooling system of portable generators, which house an engine and a generator directly driven by the engine within a casing, is as follows: Cooling fans are installed respectively on the crankshaft of an engine and on the revolving shaft of a generator; ambient air is drawn at some openings in the vicinity of the engine and generator of many ventilation openings drilled in casing end walls respectively facing the side surface opposite to the connecting portion of the engine and the generator, passes through the inside of an engine baffle cover and a generator case, and flows out from the engine baffle cover and the generator case to the periphery in the vicinity of the connecting end of the engine and the generator, to mingle together and again flow out to the outside of the casing from some openings around the air intake openings among a number of ventilation openings in both casing end walls, through the space between the outer surfaces of the baffle cover and generator case, and the inner surface of the generating set casing.

With the cooling system of the prior art, there have been such drawbacks as follows: Since the hot exit air passing around the air intake openings flows opposedly to the cool intake air, drawn from ventilating openings in casing end walls for cooling the engine and generator, there are large flow disturbances, resulting in not only a considerable level of noise, but also insufficient cooling of the engine and generator, because part of the hot exit air mixes with the cool intake air, and the counterflow of the intake air for cooling the engine and the intake air for cooling the generator produces air stagnation in the casing.

SUMMARY OF THE INVENTION

To solve aforesaid drawbacks of the prior art for the cooling system of portable generators, which house an engine and a generator directly driven by the engine within a casing, gave rise to the present invention.

Thus it can be said that the purpose and object of this invention is to provide a more efficient and noiseless engine and generator as well as a more compact portable generator.

To achieve aforesaid purpose, a portable generator according to this invention is constructed as follows: A single cooling fan is installed on a connection portion of an engine crankshaft and a generator revolving shaft to produce a unidirectional cooling air flow from intake openings in one side wall of a portable generator casing through the generator and then the engine to exit openings in the other side wall.

With an embodiment according to this invention which is constructed as described above, the unidirectional cooling air flow within the portable generator casing avoids the mingling of cool intake air to the casing and hot exit air from the casing as well as air stagnation in the casing, thereby enhancing the cooling efficiency of the engine and generator in the casing.

And also the unidirectional cooling air flow suppresses air disturbance and noise. Less disturbed air flow enables even a minimum area throttled of intake and exit openings in the casing to produce a smooth cooling air flow, thus reducing the leakage of noise in the casing and thereby increasing muffling effect. Since said cooling air flows from a low temperature generator to a high temperature engine, ideal cooling can be obtained. Furthermore, such construction as mentioned above provides an ideal layout for the fullest possible use of space, thus making the size of a portable generator extremely compact.

DETAILED DESCRIPTION OF THE PREFERRED EMBODIMENT

Figure 1:
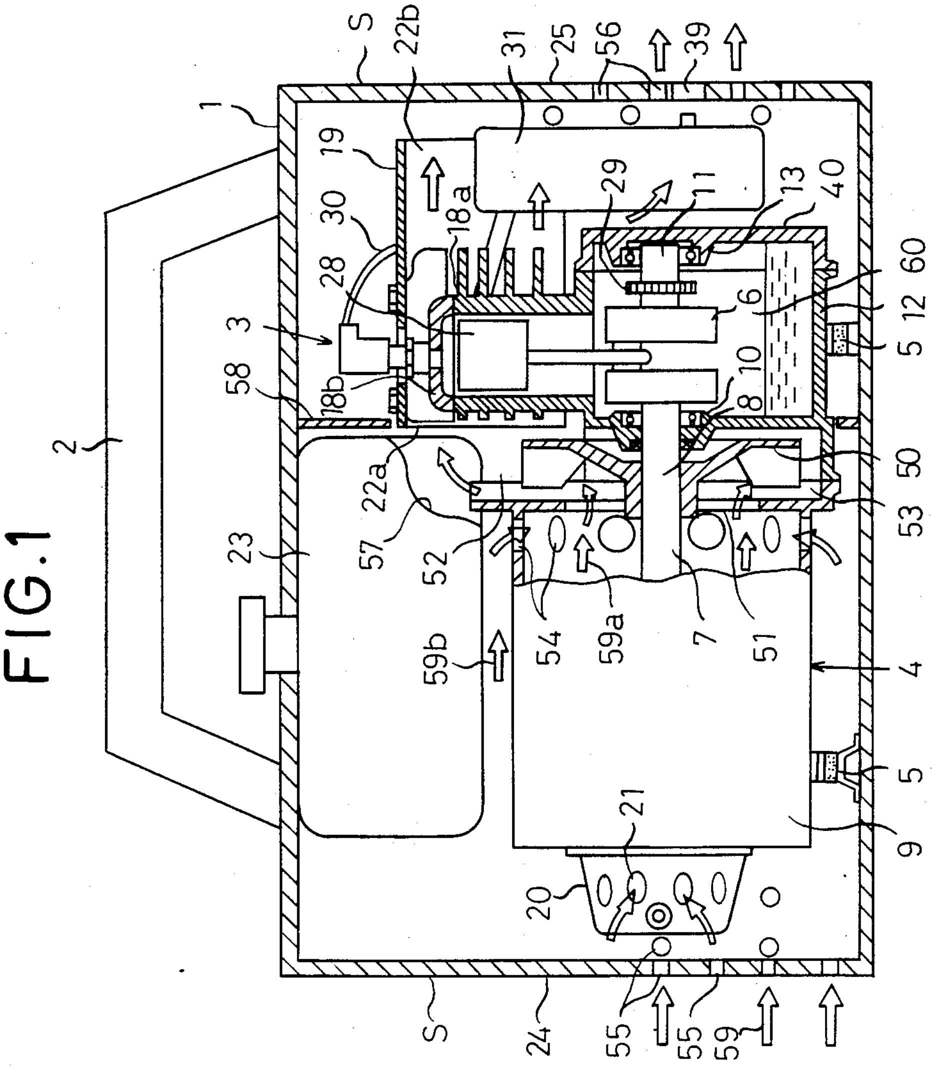
FIG. 1 is a side sectional view showing an embodiment according to the invention.
Figure 2:
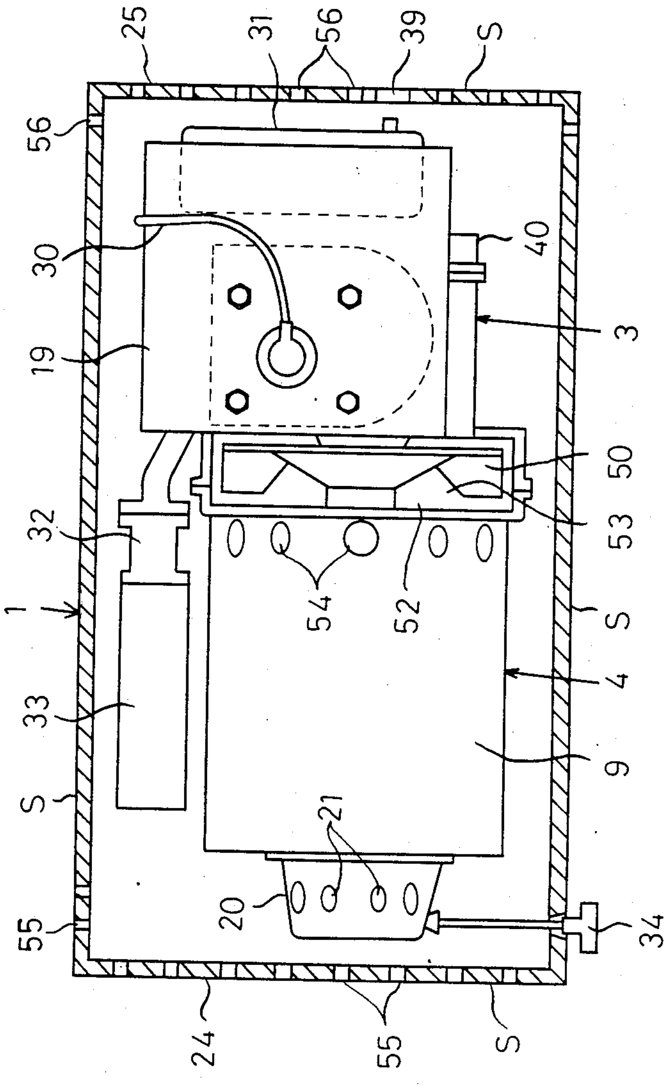
FIG. 2 is a plan showing the embodiment in FIG. 1 (a part of the components is omitted for clarity).

Referring now in detail to the illustrative embodiment according to the invention depicted in FIGS. 1 and 2, Numeral 1 is a box casing with a handle 2, in which an engine 3 and a generator 4 driven by the engine are incorporated, elastically supported by a cushion 5.

A crankshaft 6 of the engine 3 and a revolving shaft 7 of the generator 4 driven by the engine are directly connected, and an opening of a crank chamber 60 in the engine 3 opposite to the connection is disconnectably covered with a side cover 40, using screws. On a connection portion 8 of the crankshaft 6 and the revolving shaft 7, a single fan 50 for cooling the engine 3 and the generator 4 is installed, the connected shafts are supported by a bearing 10 in a crankcase 12 in the vicinity of said connection portion 8, and a side end 11 of the crankshaft 6 opposite to the connection portion 8 is supported by a bearing 13 on the inside of said side cover 40. On the side end of a case 9 for the generator 4 opposite to the engine is installed a recoil starter 20 which is driven by the revolving shaft 7 and has two or more intake openings 21.

Between the case 9 for the generator 4 and the crankcase 12 for the engine 3, a fan chamber 53 is formed with an intake opening 51 on the side face of the generator facing the connection portion 8, and an exit opening 52 on the periphery. In the cylinder portion of the case 9 for the generator are drilled two or more intake holes 54 in the vicinity of the fan. A number of air intake ports 55 are provided in the side wall 24 is the casing 1 adjacent to the recoil starter 20 or in the vicinity of the side end of the generator 4 opposite to the engine, and a number of air exit ports 56 is opened in the side wall 25 in the vicinity of the engine side cover 40 or the side end of the engine 3 opposite to the generator. A fuel tank 23 is placed adjacent to and above the generator, and an air guide recess 57 is engraved on the fuel tank 23 adjacent and facing the outside diameter of the cooling fan 50.

A muffler 31 for the engine 3 is arranged on the side of the engine 3 opposite to the generator 4. The muffler 31, an engine cylinder 18*a* and a cylinder head 18*b* are all together covered by an air guide plate 19, which provides an air inlet opening 22*a* on the side of the cooling fan 50 and an air exit opening 22*b* on the side of the muffler 31.

In FIG. 1, numeral 58 is a plate to prevent the back-flow of hot air, which is secured on the inner surface of the casing 1.

In aforesaid configuration, operation of the engine 3 rotates the cooling fan 50 which in turn generates a cooling air 59*a,* starting at the air intake ports 55 in the casing 1 and passing via the air intake openings 21 in the coil starter through the inside of the generator 4 and another cooling air 59*b* passing around the generator 4, in order to cool the generator 4. On the other hand, the cooling air 59*b* around the generator is drawn in the inside of the generator through the air intake holes 54, mingled with the former cooling air in the generator, and altogether flows out into the fan chamber 53. And then the direction of the mixed cooling air pressurised by the fan is turned by the air guide surface 57 on the fuel tank 23 to cool the cylinder 18*a* and the cylinder head 18*b* of the engine 3. After cooling them, the mixed cooling air passes around the muffler 31 to flow out of the casing 1 at the air exit ports 56.

As mentioned above, in this embodiment, the cooling air 59 flows unidirectionally through the casing 1, in other words is drawn in at side wall 24 of the casing 1 adjacent to the end of the generator opposite to the engine and is blown out at the other side wall 25 adjacent to the end of the engine 3 opposite to the generator. Therefore, there is no possibility of the mixing of the intake air to the casing and the hot exit air from the casing nor air stagnation of the cooling air in the casing 1, thus providing sufficient cooling of the generator 4 and the engine 3 in the casing 1. And also as mentioned above, the unidirectional flow of the cooling air 59 minimizes air disturbance and noise level, which enables the cooling air 59 to flow smooth even with the smallest possible area throttled of the air intake and exit ports 55 and 56 in the casing 1, thereby minimizing the leakage of the noise generated in the casing 1 for enhanced soundproof effect. The flow of said cooling air 59 from the low temperature generator 4 to the high temperature engine provides for an ideal cooling system.

Furthermore, since the fuel tank is arranged adjacent to and above the low temperature generator as shown in said embodiment, the relatively low temperature cooling air permits the fuel tank 23 to be cooled sufficiently to prevent excessive rise in fuel temperature. And since the high temperature muffler 31 is arranged at the side opposite to the generator 4 of the engine 3 to be cooled by the cooling air which has passed the engine 3, the cooling air alleviates the heat load of the muffler thus providing for a wide option of its materials as with the fuel tank 23.

In FIG. 1, the generator 4 houses an ignition flywheel magnet (not shown) which may be combined integrally with the cooling fan 50. And the crankshaft 6 in the engine 3 and the revolving shaft 7 in the generator 4 may be connected through a separate shaft distance piece, and the recoil starter 20 which is incorporated in the casing 1 may be so arranged that it projects out of the casing 1.

In FIG. 1, numerical 28 is a piston in the engine 3, and numerals 29 and 30 are respectively a crankgear and a high pressure ignition cord. In FIG. 2, numerals 32, 33, 34 and 39 are respectively a carburetor, air cleaner, starter handle and specialized exit ports for the muffler 31.

What is claimed is:

1. A portable generator comprising: a closed housing; an engine, a generator, a cooling fan, a muffler, and an air guide plate, all arranged in said closed housing; said engine having an engine shaft, said generator being connected to said engine shaft; said cooling fan being arranged on said engine shaft between said engine and said generator; said muffler being arranged adjacent said engine and remote from said generator; said air guide plate covering said engine and said muffler, and providing an air inlet opening on the side of said cooling fan and an air exit opening on the side of said muffler; said housing having a first side wall adjacent to said generator, and a second side wall adjacent to said muffler; said first side wall having a plurality of air intake holes, and said second side wall having a plurality of air exit holes; a plate inside said housing and outside said air guide plate;

whereby said cooling fan draws air through said inlet holes over said generator and forces the air inside said air guide plate over said engine and over said muffler and out through said exit holes.

2. A portable generator according to claim 1, comprising a carburetor and a fuel tank, both arranged in said closed housing adjacent said generator; and an air guide recess engraved on said fuel tank adjacent and facing the outside diameter of said cooling fan.

* * * * *